(12) United States Patent
Boros et al.

(10) Patent No.: US 7,135,789 B2
(45) Date of Patent: Nov. 14, 2006

(54) CONTROLLING DEVICES USING CASCADED CONTROL UNITS

(75) Inventors: Mircea Cristian Boros, Ottawa (CA); David Alan Brown, Carp (CA)

(73) Assignee: Potentia Semiconductor, Inc., Wilmington, DE (US)

( * ) Notice: Subject to any disclaimer, the term of this patent is extended or adjusted under 35 U.S.C. 154(b) by 578 days.

(21) Appl. No.: 10/435,462

(22) Filed: May 12, 2003

(65) Prior Publication Data

US 2004/0227404 A1    Nov. 18, 2004

(51) Int. Cl.
*H02J 1/00*    (2006.01)
*H02J 3/00*    (2006.01)
*H02J 7/00*    (2006.01)

(52) U.S. Cl. .......................... 307/43; 307/41; 307/38; 308/29; 700/8

(58) Field of Classification Search .................. 307/43, 307/41, 38, 29; 700/8
See application file for complete search history.

(56) References Cited

U.S. PATENT DOCUMENTS 4,799,141 A    1/1989    Drusinsky et al. ............ 700/12
5,097,437 A    3/1992    Larson ........................ 712/245
6,374,144 B1 *  4/2002    Viviani et al. ................ 700/12

FOREIGN PATENT DOCUMENTS

WO    WO 02/31951 A2    10/2000

* cited by examiner

*Primary Examiner*—Leo Picard
*Assistant Examiner*—Michael B. Holmes (57)    ABSTRACT

Power supplies, supplied with an input voltage to produce output voltages, are controlled in a desired sequence, and their output voltages are monitored, by respective state machines of two or more control units which are coupled in cascade by a bidirectional signal path on which commands and acknowledgements are coupled serially in frames. Within each control unit, each state machine communicates with all of the other state machines, so that the power supplies controlled by a single control unit can include divergent and convergent as well as linear sequence paths. The sequence is linear between adjacent control units, with logical combinations of received and locally-produced commands and acknowledgements. An input state machine in the first control unit in the cascade monitors the input voltage to initiate a power-up sequence.

15 Claims, 5 Drawing Sheets

FIG. 12

CONTROLLING DEVICES USING CASCADED CONTROL UNITS

This invention relates to controlling devices using cascaded control units, and is particulary concerned with signal coupling between cascaded power supply control units for controlling or sequencing power supplies.

REFERENCE TO RELATED APPLICATIONS

Reference is directed to the following copending U.S. patent applications, all filed on May 2, 2003, the entire disclosure of each of which is hereby incorporated herein by reference:

"Power Supply Controller", R. Orr et al., (79115-8, PP010);

"Sequencing Power Supplies", D. Brown et al., (79115-20, PP011);

"Coupling Signals Via A Coupling Arrangement", D. Brown et al., (79115-16, PP014).

BACKGROUND

The related applications describe and claim a power supply controller, and coupling of signals in such a controller, which can be used for controlling a plurality of isolating power supplies, such as switch mode power supplies or DC power converters and voltage regulators, for providing controlled electrical power to loads. For example, the power supplies may provide different supply voltages to various electrical circuits on a circuit card on which the power supply controller is also provided.

In such a power supply controller, separate IC (integrated circuit) control units can be provided on the primary and secondary sides of a transformer that serves to maintain an electrical isolation barrier between input and output sides of the isolating power supplies. The transformer conveniently provides for signal coupling in both directions between the primary and secondary control units, and also for power transfer from its primary to its secondary side to supply operating power to the secondary control unit and any related circuits (for example, a non-volatile memory) of the power supply controller on the secondary side of the transformer.

In embodiments of the inventions described in the related applications, the power supply controller and the signal coupling within it are arranged for controlling up to six power supplies. To this end, each of the primary and secondary control units has six converter state machines (CSMs), one for each of up to six controlled power supplies, as well as an input state machine (ISM) relating to an input or supply voltage.

Regardless of the particular number of, in this case six, controlled power supplies for which a power supply controller is designed, situations can arise in which it is desired to control a larger number of power supplies. It is therefore desirable to be able to provide a plurality of power supply controllers, hereinafter referred to as power supply controller units or PSCUs, for controlling larger numbers of power supplies.

However, a significant aspect of such control relates to sequencing of the controlled power supplies, for power-up and/or shut-down of the controlled power supplies in particular sequences and in accordance with monitored conditions relating to the controlled power supplies. To this end, it is desirable for all of the CSMs in different PSCUs to be informed of relevant conditions (including, for example, fault situations) of each other state machine. For a number of n state machines, this implies a network of n(n−1) signal paths among the state machines, and quickly becomes impractical with increasing n, i.e. an increasing number of controlled power supplies. Furthermore, such a network of signal paths is inconsistent with providing a small, integrated package form of the PSCU as described in the related applications.

Accordingly, there is a need to facilitate signal coupling among a plurality of units, such as PSCUs as described above, in a manner that can convey needed information without requiring an extensive network of signal paths.

SUMMARY OF THE INVENTION

One aspect of this invention provides a method of controlling a plurality of controlled devices in a predetermined sequence, comprising the steps of: providing a plurality of control units each comprising a plurality of state machines each for controlling a respective controlled device; allocating the plurality of controlled devices to respective state machines in said plurality of control units whereby the control units are cascaded in accordance with the predetermined sequence, with a single linear path of the predetermined sequence between adjacent cascaded control units; within each of the control units, coupling signals of each state machine to each other state machine for controlling the respective controlled devices, controlled by said state machines, in accordance with the predetermined sequence; and between adjacent ones of the cascaded control units, coupling signals relating to the state machines of the control units in both directions between the cascaded units for control of the controlled devices in accordance with the predetermined sequence.

Preferably the controlled devices comprise power supplies.

The method can include the step of, in at least one control unit, logically combining signals relating to the state machines of the control units received from a preceding control unit in a respective signal direction with signals relating to the state machines of said one control unit to produce the signals relating to the state machines of the control units for a subsequent control unit in the respective signal direction.

Another aspect of the invention provides a method of controlling a plurality of power supplies, comprising the steps of: providing a plurality of power supply controller units (PSCUs) in cascade, each PSCU comprising an input state machine for monitoring an input voltage for the power supplies and a plurality of further state machines each for enabling and monitoring an output of a respective power supply; in a first PSCU in the cascade, determining for each of said further state machines a dependence upon the input voltage or the output of a power supply as monitored by at least one other state machine of this first PSCU, for enabling the respective power supply; in each subsequent PSCU in the cascade, determining for one of the further state machines of this subsequent PSCU a dependence upon the output of a power supply as monitored by a state machine of the respective preceding PSCU, and determining for each other of the further state machines of this subsequent PSCU a dependence upon the output of a power supply as monitored by at least one other state machine of this subsequent PSCU, for enabling the respective power supply; and coupling signals relating to the state machines of the PSCUs in both directions between adjacent PSCUs in the cascade;

whereby the power supplies are enabled in a predetermined sequence in dependence upon the input voltage.

The signals coupled between adjacent PSCUs can comprise commands for enabling or disabling the controlled power supplies and acknowledgements of said commands which preferably are coupled serially in signal frames.

Where there are at least three PSCUs, the method preferably includes the step of, in at least one PSCU, logically combining signals relating to the state machines of the PSCUs received from a preceding PSCU in a respective signal direction with signals relating to the state machines of said one PSCU to produce the signals relating to the state machines of the PSCUs for a subsequent PSCU in the respective signal direction.

A dependence upon the input voltage can be determined for at least two of said further state machines in the first PSCU in the cascade for enabling the respective power supplies. Similarly, in at least one of the PSCUs, a dependence upon the output of the same power supply, as monitored by at least one other state machine, can be determined for each of at least two of said further state machines of the PSCU, to provide a divergent sequence. Further, in at least one of the PSCUs, a dependence upon the outputs of a plurality of power supplies, as monitored by a corresponding plurality of other state machines, can be determined for at least one of said further state machines of the PSCU, to provide a convergent sequence.

The invention further provides a power supply control arrangement comprising: a plurality of power supply controller units (PSCUs) each comprising an input state machine for monitoring an input voltage for a plurality of controlled power supplies and a plurality of further state machines each for enabling and monitoring an output of a respective power supply, the PSCUs being coupled in cascade for signal coupling therebetween, and the state machines being arranged, for carrying out the above method; and a plurality of power supplies arranged to receive said input voltage and controlled by respective ones of said further state machines.

Desirably, the PSCUs comprise programmable devices identical to one another, each PSCU including a non-volatile memory for storing information relating to the predetermined sequence for the power supplies controlled by the PSCU.

BRIEF DESCRIPTION OF THE DRAWINGS

The invention will be further understood from the following description by way of example with reference to the accompanying drawings, in which.

DETAILED DESCRIPTION

Figure 1:
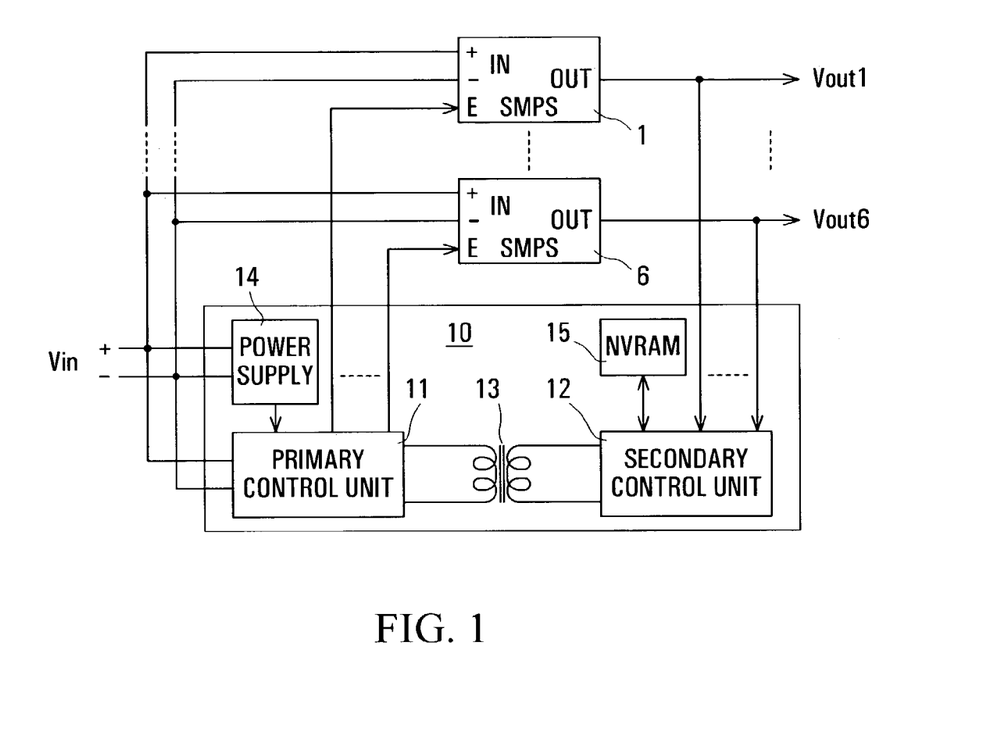
FIG. 1 shows a block diagram of a power supply controller unit (PSCU) and a plurality of controlled power supplies.

Referring to FIG. 1, a power supply controller unit (PSCU) 10 is illustrated for controlling a plurality of isolating power supplies, for example up to six power supplies two of which are represented in FIG. 1 by switched mode power supplies (SMPS) 1 and 6, others being indicated by dashed lines. The PSCU 10 comprises two control units 11 and 12, referred to as primary and secondary control units respectively, which are electrically isolated from one another and between which signals are coupled in both directions by a transformer 13. The PSCU 10 also comprises a power supply 14 for the primary control unit 11, and a non-volatile memory (NVRAM) 15 coupled to the secondary control unit 12.

Each of the power supplies 1, . . . 6 has an enable input E and inputs + and − for a source voltage Vin on its primary side, and an isolated output OUT on its secondary side providing a respective output voltage Vout1, . . . Vout6. These output voltages are monitored by the secondary control unit 12 by connections to the output paths as illustrated, and the primary control unit 11 controls the power supplies 1, . . . 6 by connections to the respective enable inputs E. The isolation provided by the transformer 13 maintains the isolation of the power supplies 1, . . . 6 between their primary and secondary sides. The source voltage Vin is also supplied to the power supply 14, which provides a regulated supply voltage to the primary control unit 11, and is monitored by the primary control unit 11 as further described below.

A supply voltage for the secondary control unit 12 and the NVRAM 15 can be derived from a separate isolating power supply (not shown) from the primary side, but is preferably derived from the secondary side of the transformer 13 by rectifying signals coupled from the primary control unit and driven with a sufficient current drive to provide this secondary supply voltage, as described in the related applications. The NVRAM 15 serves to store information used in operation of the PSCU 10, this information being transferred to shadow registers in the control units 11 and 12 on power-up of the PSCU 10.

By way of example, the PSCU 10 and the controlled power supplies 1, . . . 6 may all be provided on a circuit card which also includes electrical circuits constituting loads to be powered by the power supplies. In use, the circuit card is inserted in an equipment slot and thereby connected to a backplane which provides + and − connections to a power source providing the voltage source Vin, which is for example a nominally 48 volt source.

Although not shown in FIG. 1, the control units 11 and 12 can include further connections to the power supplies 1, . . . 6, for example for trimming their output voltages and/or enabling the power supplies via secondary side enable inputs.

All of the components 11 to 15 of the PSCU 10 are desirably integrated into a single package, in which each of the control units 11 and 12 conveniently comprises an application-specific IC (ASIC).

Each of the control units 11 and 12 includes six converter state machines (CSMs), referred to as CSM0 to CSM5, each provided for a respective one of the six controlled power supplies 1, . . . 6, an input state machine (ISM) in respect of the source voltage Vin, and a master state machine (MSM) of a power sequence manager (PSM), between which signals are exchanged by being broadcast on a shared state bus. The information of this state bus is extended between the primary and secondary control units 11 and 12 through the signal coupling in both directions via the transformer 13. Via these communications, synchronism is maintained between the corresponding state machines in the two control units 11 and 12.

In particular, states are determined by the CSMs in the secondary control unit 12, where the monitoring of the output voltages of the corresponding power supplies takes place, and signals from these CSMs are communicated via the bus and the transformer 13 to maintain synchronism of the respective CSMs in the primary control unit 11. For example, CSM0 in each of the control units 11 and 12 may be allocated to the power supply 1. While this power supply is disabled, the CSM0 in the secondary control unit 12 may determine that it is to be enabled, and communicate this via the bus and the transformer 13 to the CSM0 in the primary control unit 11, which enables the power supply 1 via the latter's enable input E and acknowledges the new state so that the CSM0 in both control units remain synchronized as to the state of the power supply 1.

By way of example, the bus providing for communications among the state machines can be an 8-bit bus which is daisy-chained through all of the state machines and operated in a tdm (time division multiplex) manner with 8 time slots each allocated for communications from a respective state machine to the bus. Each state machine drives the bus with its own information during its allocated time slot, and in the other time slots can receive the information of the other state machines.

When the source or input voltage Vin is initially connected, a power-up process is followed in which the PSCU 10 disables all of the controlled power supplies 1, . . . 6, establishes power transfer to the secondary control unit 12 and signal communications between the control units 11 and 12 via the transformer 13, and downloads information stored in the NVRAM 15 to shadow registers in the control units 11 and (via the transformer 13) 12. This downloaded information includes information, for example as further described below, for determining the operation of the PSCU 10, and in particular for sequencing the controlled power supplies 1, . . . 6 so that they are powered up and down in a desired and controlled manner.

Figure 2:
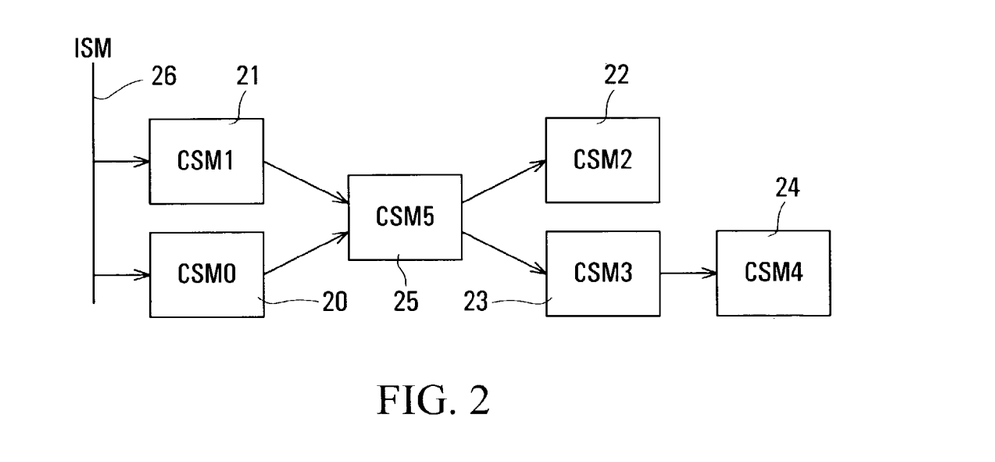
FIG. 2 is a representation of one example of converter state machines (CSMs) in the PSCU of FIG. 1.

This sequencing can be represented by a sequence topology. FIG. 2 shows an example of a power-up sequence topology; topologies can be similarly represented for a normal or a fast power shut-down sequence (typically this can be the reverse of the power-up sequence) and for a fault shut-down sequence. In this sequence topology, a vertical line 26 represents determination by the ISM that conditions for initiating a power-up sequence are satisfied, and is labelled ISM accordingly. Boxes 20 to 25 identify the state machines CSM0 to CSM5 respectively, and arrows represent the topology of the power-up sequence, i.e. the dependence of each state machine on one or more other state machines for enabling its respective controlled power supply in a desired power-up sequence.

Parameters representing the conditions for initiating a power-up sequence, parameters for determining the topology or dependence of each state machine on one or more other state machines in the desired power-up sequence, and parameters relating to the normal, fast, and fault shut-down sequences can all be determined in any desired manner, stored in the NVRAM 15, and downloaded to the shadow registers in the control units 11 and 12 as described above. For example, these parameters can comprise voltage and/or time thresholds for the input voltage Vin as monitored by the ISM and for the output voltages Vout1 to Vout6 of the controlled power supplies as monitored by the respective CSMs, as described in more detail in the related applications referred to above.

As a simple example, for a power-up sequence these parameters may include an input voltage threshold which must be exceeded by the input voltage Vin as monitored by the ISM, and for each of the controlled power supplies an output voltage threshold which must be exceeded by the respective output voltage as monitored by the respective CSM, in order for the respective state machine to provide, in its respective time slot on the state bus, an indication that the monitored voltage meets a power-up condition, on which one or more other state machines may be dependent in order to continue the desired power-up sequence. Again, this is described in more detail in the related applications referred to above.

The sequence topologies can have many forms, and in particular may include any or all of a variety of sequence components, referred to as independent, linear, diverging, and converging sequence components. By way of example, FIG. 2 illustrates these sequence components in a power-up sequence topology of the six CSMs in the PSCU 10. It should be appreciated that FIG. 2 represents only the sequence topology or dependence among the state machines, and not the physical communication of signals among the state machines. As described above, the physical communication of signals among the state machines is via the shared state bus, so that each state machine is informed of relevant conditions of each other state machine.

As illustrated in FIG. 2 by separate arrowed lines from the line 26 to each of the boxes 20 and 21, each of CSM0 and CSM1, independently of one another, is dependent upon the ISM determining that conditions for initiating the power-up sequence are satisfied to enable its respective controlled power supply. As represented by arrowed lines converging from each of the boxes 20 and 21 to the box 25, the CSM5 is dependent upon power-up of the power supplies controlled by each of CSM0 and CSM1 to enable its controlled power supply. Thus in this sequence topology both of the power supplies controlled by the state machines CSM0 and CSM1 must produce output voltages exceeding their respective output voltage thresholds in order for the power supply controlled by the state machine CSM5 to be enabled to power up.

Similarly, in the sequence topology of FIG. 2 separate arrowed lines diverge from the box 25 to each of the boxes 22 and 23, representing that each of the state machines CSM2 and CSM3 is separately dependent, to enable its respective controlled-power supply, upon the output voltage of the power supply controlled by the state machine CSM5 exceeding its respective threshold voltage. Further, as shown by an arrowed line from the box 23 to the box 24, in the sequence topology of FIG. 2 the state machine CSM4 is linearly dependent, to enable its respective controlled power supply, upon the output voltage of the power supply controlled by the state machine CSM3 exceeding its respective threshold voltage.

Conveniently, in one form of the PSCU 10, a configuration register is provided for information representing which of the six CSMs has an associated controlled power supply, and each of the CSMs has a respective register for information representing its dependence on other state machines in the respective sequence for power up, normal or fast shut-down, and fault shut-down, respectively. This information is used by the secondary control unit 12, whose shadow registers are provided with this information downloaded from the NVRAM 15 as described above.

Figure 5:
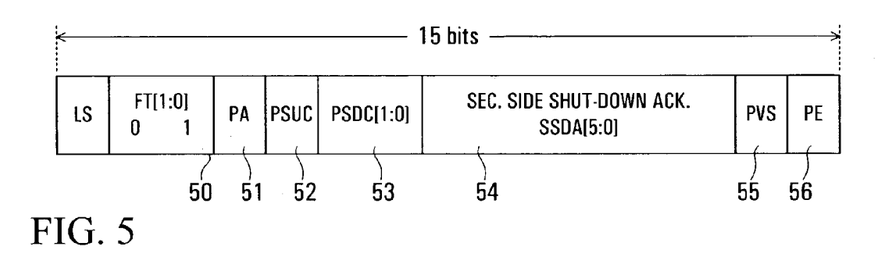
FIGS. 5 and 6 illustrate information of signal frames coupled in opposite directions between primary and secondary control units of each PSCU.
Figure 6:
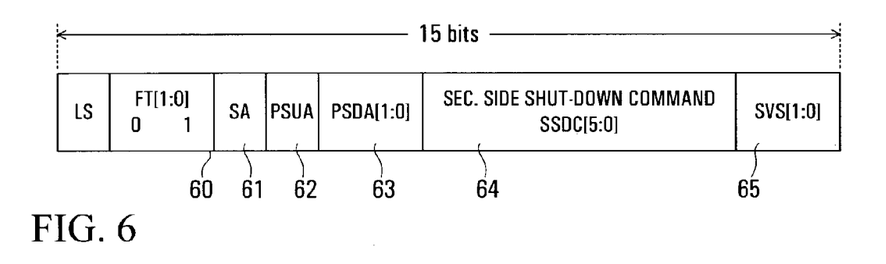

In operation of the PSCU 10, information including commands, acknowledgements, and status signals is communicated between the primary and secondary control units 11 and 12 in order to establish and maintain their synchronism, as described below with reference to FIGS. 5 and 6. This information, and the configuration of the PSCU 10 as described above, are sufficient for up to six CSMs and their controlled power supplies. In order to accommodate a greater number of CSMs and controlled power supplies, this invention provides a cascade arrangement which permits a plurality of PSCUs to be used in cooperation with one another, while maintaining desired sequence topologies for power-up and shut-down of the controlled power supplies.

As indicated in the Background above, for a number of n state machines, communications between all state machines implies a network of n(n−1) signal paths among the state machines. The shared state bus as described above, providing a data width of 8 bits with 8 multiplexed time slots, provides for such signal paths among 8 state machines (the MSM, ISM, and 6 CSMs as described above); extending this for a larger number of state machines, especially where the state machines may be provided in a plurality of separate PSCUs, quickly becomes impractical. The cascade arrangement provided in accordance with embodiments of this invention avoids or reduces this difficulty.

Figure 3:
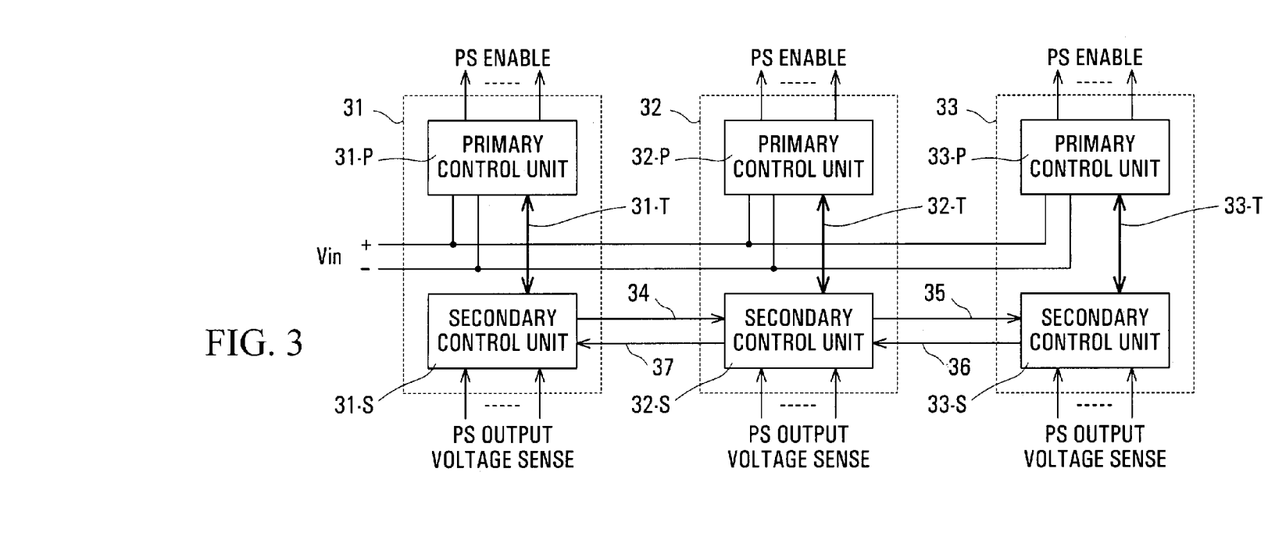
FIG. 3 illustrates an arrangement comprising three cascaded PSCUs with signals coupled between them in accordance with an embodiment of the invention.

By way of example, FIG. 3 illustrates an arrangement comprising three cascaded PSCUs 31 to 33 each of which can be as described above for the PSCU 10. Accordingly, FIG. 3 shows each of the PSCUs 31 to 33 as including a respective primary control unit 31-P to 33-P and secondary control unit 31-S to 33-S with signals and power coupled between them as shown by a respective line 31-T to 33-T representing the signal and power coupling via the transformer 13 as described above. Each of the PSCUs 31 to 33 is supplied with the input voltage Vin as illustrated in FIG. 3, and includes 6 CSMs as described above for providing enable signals PS ENABLE from its primary control unit to up to 6 separately controlled power supplies (not shown in FIG. 3) and for receiving via inputs PS OUTPUT VOLTAGE SENSE the output voltages of these power supplies for monitoring in its secondary control unit, as described above. Consequently, the 3 PSCUs 31 to 33 shown in FIG. 3 can together control the sequencing of up to 18 separately controlled power supplies.

A bidirectional cascade signal path is provided between the secondary control units of adjacent ones of the PSCUs. In what is referred to herein as a downstream direction, this cascade signal path comprises a connection 34 from a cascade down (CSDN) output of the secondary control unit 31-S to a CSDN input of the secondary control unit 32-S, and a connection 35 from a CSDN output of the secondary control unit 32-S to a CSDN input of the secondary control unit 33-S. In the opposite direction, referred to herein as an upstream direction, this cascade signal path comprises a connection 36 from a cascade up (CSUP) output of the secondary control unit 33-S to a CSUP input of the secondary control unit 32-S, and a connection 37 from a CSUP output of the secondary control unit 32-S to a CSUP input of the secondary control unit 31-S.

The cascade signal path in this embodiment of the invention imposes constraints in that the power controller sequence topology must have a single linear path between state machines of the adjacent PSCUs in the cascade, and only the last PSCU in the downstream direction can have one or more CSMs on which no other CSMs are dependent in the power-up sequence. An example of a sequence topology for the CSMs of the PSCUs 31 to 33 of FIG. 3 which meets these constraints is illustrated in FIG. 4.

Figure 4:
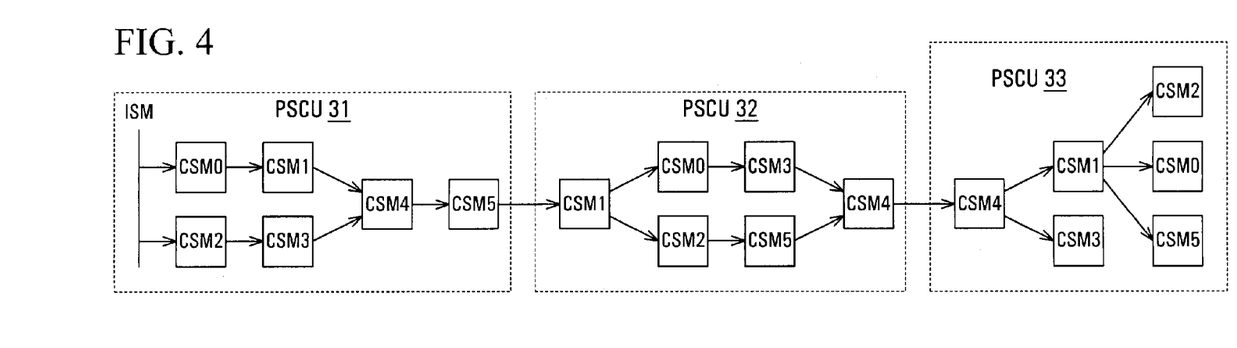
FIG. 4 is a representation of one configuration of CSMs in the arrangement of FIG. 3.

Referring to FIG. 4, a relatively arbitrary power-up sequence topology is shown, in a similar manner to that of FIG. 2, for the PSCUs 31 to 33 each having six state machines CSM0 to CSM5. As shown in FIG. 4, only CSMs in the first (in the downstream direction) PSCU 31 can be dependent upon the ISM; in this example CSM0 and CSM2 of PSCU 31 are dependent upon the ISM. Also in the PSCU 31, CSM1 is linearly sequenced after (i.e. enables its controlled power supply after power up of the power supply controlled by) CSM0; CSM3 is linearly sequenced after CSM2; CSM4 is convergently sequenced after both CSM1 and CSM3; and CSM5 is linearly sequenced after CSM4.

In the PSCU 32 as shown in FIG. 4, CSM1 is linearly sequenced after CSM5 of the adjacent preceding PSCU 31; CSM0 and CSM2 are divergently sequenced after CSM1; CSM3 and CSM5 are linearly sequenced after CSM0 and CSM2 respectively; and CSM4 is convergently sequenced after both CSM3 and CSM5. In the PSCU 33 as shown in FIG. 4, CSM4 is linearly sequenced after CSM4 of the adjacent preceding PSCU 32; CSM1 and CSM3 are divergently sequenced after CSM4; and CSM0, CSM2, and CSM5 are divergently sequenced after CSM1.

It can be seen that the sequence topology of FIG. 4 complies with the above constraints in that only CSM0, CSM2, CSM3, and CSM5 in the last PSCU 33 in the sequence have no other state machines dependent upon them, and in each case there is a single linear path (i.e. there is only one path and it is not convergent or divergent) of the sequence topology between adjacent PSCUs. It can also be appreciated from FIG. 4 that the CSMs can be allocated to respective controlled power supplies in any order. Within each of the PSCUs 31 to 33 the sequencing information is stored in and downloaded to the control units from the respective NVRAM as described above.

As described above, within each PSCU signals are coupled via the transformer 13 of FIG. 1, represented by the lines 31-T to 33-T in FIG. 3, to establish and maintain synchronism between the state machines in the primary and secondary control units of each PSCU. This coupling of signals is conveniently in alternating directions in a ping-pong manner in frames each comprising, for example, 24 Manchester-encoded data bits in each direction between the primary and secondary control units. By way of example, the 24 bits in each frame in each direction can comprise a 4-bit preamble constituted by an alternating sequence of 1 and 0 bits, a 2-bit start-of-frame (SOF) indication with a reversed alternating bit sequence, a payload frame of 15 bits, and a payload cyclic redundancy check (CRC) of 3 bits. For example, the 15-bit payload frame can comprise a frame 50 as shown in FIG. 5 for signalling from the primary control unit to the secondary control unit, and a frame 60 as shown in FIG. 6 for signalling from the secondary control unit to the primary control unit.

In this example, each 15-bit payload frame 50 or 60 comprises an initial link status bit LS, a 2-bit frame type FT[1:0], and another 12 bits as described below. The link status bit LS represents whether (LS=1) or not (LS=0) the sending control unit is correctly receiving information via the link or coupling between the primary and secondary control units. If a link error threshold is exceeded in either control unit, it sends the bit LS=0 to initiate a reset of both control units. The frame type bits FT[1:0] are 01 as shown in FIGS. 5 and 6 to represent control and status (C&S) information coupled between the primary and secondary control units. Other frame type bits can be used to indicate other types of information, such as null frames, and address or data frames for a serial interface between the NVRAM 15 and the control units 11 and 12.

In view of correspondence between the frames 50 and 60 for the two directions of signal coupling, these figures are described together.

Following the frame type, the frame 50 has a primary alive (PA) bit 51 which indicates to the secondary control unit whether (PA=1) or not (PA=0) the primary control unit which sends this frame is ready for normal operation. The frame 60 similarly has a secondary alive (SA) bit 61 which indicates to the primary control unit whether (SA=1) or not (SA=0) the secondary control unit which sends this frame is ready for normal operation.

The frame 50 then has a primary side start-up command (PSUC) bit 52, and a 2-bit primary side shut-down command PSDC[1:0] 53, which represent respectively start-up, fast shut-down, and normal shut-down commands of the primary control unit. The secondary control unit responds to these and acknowledges them with respectively a primary side start-up acknowledge (PSUA) bit 62 and a 2-bit primary side shut-down acknowledgement PSDA[1:0] 63 in the frame 60.

Conversely, the frame 60 subsequently has a 6-bit secondary side shut-down command SSUC[5:0] 64, containing one bit for each of the six CSMs and representing a shut-down command for the respective state machine and the power supply controlled thereby. The primary control unit responds to these and acknowledges them with respective bits of a 6-bit secondary side shut-down acknowledgement SSDA[5:0] 54 in the frame 50.

Using these commands and acknowledgements, in each PSUC, each of the primary and secondary control units informs the other control unit of its operating state and commands, and acknowledges information received from the other control unit, so that both of the control units are fully informed of operating states on both the primary and secondary sides, and can control the controlled power supplies accordingly.

The frame 50 further includes a primary side voltage status (PVS) bit 55 which indicates to the secondary control unit whether or not the primary side supply voltage is good, and a primary side error (PE) bit 56 which indicates to the secondary control unit whether or not errors in frames received from the secondary side exceed an error threshold.

The frame 60 further includes a 2-bit secondary side voltage status (SVS) 65. One of these bits indicates to the primary control unit whether or not the secondary side supply voltage is good; the other indicates whether or not a restart condition, for enabling the power supplies controlled by the PSUC, is satisfied. This restart condition, representing that the monitored output voltage of each controlled power supply is below a respective threshold for restart, is one of the conditions discussed above for initiating a power-up sequence.

Thus necessary C&S information is communicated between the primary and secondary control units of each PSCU. The cascade signal paths CSDN and CSUP are used to communicate similar, but consolidated, information among the different PSCUs. To this end, the power sequence manager (PSM) in each PSCU serves to translate between a cascade chain protocol, for signal transmission to and reception from the cascade signal paths CSDN and CSUP, and the protocol used on the shared state bus for communication among the state machines of the PSCU as described above.

For example, it can be appreciated from the above description that in the arrangement of FIG. 3, for example with the power-up sequence topology of FIG. 4, monitoring of the input voltage Vin is carried out by the PSCU 31. Accordingly, its secondary control unit 31-S serves as a master of the cascaded PSCUs 31 to 33, for example initiating a normal or fast shut-down sequence in response to an under-voltage state of the input voltage Vin, and initiating a power-up sequence after a fault condition for any of the controlled power supplies when the restart conditions are satisfied. To this end, it must communicate commands not only via the shared state bus to the CSMs of this PSCU 31, but also via the cascade signal path CSDN to the other PSCUs 32 and 33, and it must receive corresponding acknowledgements via the cascade signal path CSUP from these other PSCUs 32 and 33. Similarly, it must receive control and status information, including for example information on the restart condition referred to above, via the cascade signal path CSUP from the other PSCUs.

Accordingly, the PSM in each PSCU communicates information via the cascade signal paths in frames 70 and 80 as described below with reference to FIGS. 7 and 8 respectively, which relate to the CSDN and CSUP directions respectively. In view of correspondence between the frames 70 and 80 for the two signal directions, FIGS. 7 and 8 are described together.

Figure 7:
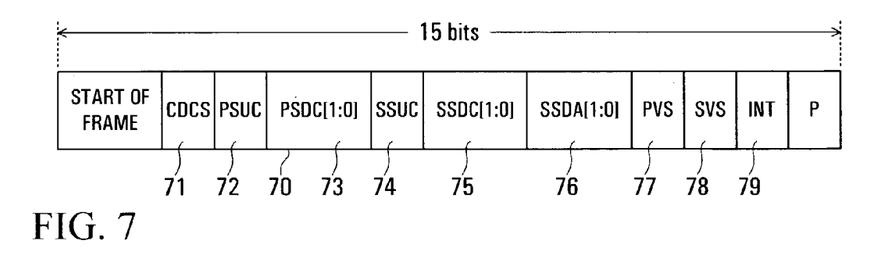
FIGS. 7 and 8 illustrate information of signal frames coupled in opposite directions between adjacent PSCUs in the arrangement of FIG. 3.
Figure 8:
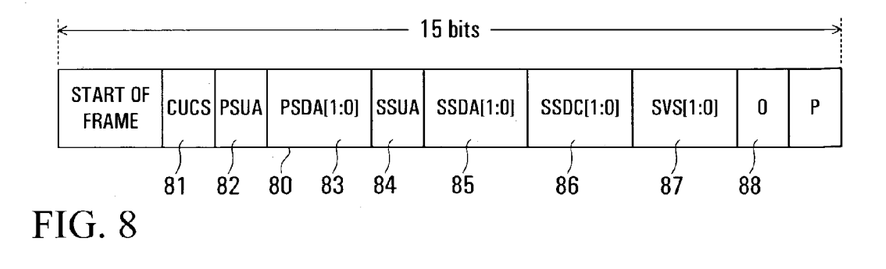

As illustrated in FIGS. 7 and 8, each frame of information on the cascade signal paths CSDN and CSUP comprises 15 bits, of which the first 2 bits are a start-of-frame (SOF) indication, the next 12 bits are data bits as described below, and the last bit is a parity bit P, for example for odd parity. The data bits are for example Manchester encoded, facilitating clock recovery when the PSCUs operate asynchronously from one another, for example with a clock signal tolerance of ±5% for each PSCU. To facilitate detection, the SOF indication can comprise a first bit encoded as a Manchester code violation of the same polarity as the last, parity, bit of the preceding frame (e.g. a logic 1 throughout the bit duration if the parity bit was a logic 1), followed by a second bit encoded as the complement of that parity bit. The phase of the Manchester encoded bit stream can be determined from synchronizing frames which can be transmitted instead of the data frames illustrated in FIGS. 7 and 8; for example each synchronizing frame can comprise the SOF indication followed by an alternating pattern of 1 and 0 bits.

Following the SOF indication, the CSDN frame 70 has a cascade down channel status (CDCS) bit 71, and the SSUP frame 80 has a cascade up channel status (CUCS) bit 81, which indicates whether (bit=1) or not (bit=0) the respective cascade channel is operating and synchronized.

The CSDN frame 70 then has a primary side start-up command (PSUC) bit 72 and a 2-bit primary side shut-down command PSDC[1:0] 73, which represent respectively start-up, fast shut-down, and normal shut-down commands of the primary control unit of the respective PSCU, similar to these commands in the frame 50 described above. Conversely, the CSUP frame 80 has a primary side start-up acknowledge (PSUA) bit 82 and a 2-bit primary side shut-down acknowledgement PSDA[1:0] 83 to acknowledge these commands.

The CSDN frame 70 then has a secondary side start-up command (SSUC) bit 74 and a 2-bit secondary side shut-down command SSDC[1:0] 73, which represent respectively start-up, over-voltage shut-down, and under-voltage shut-down commands of the secondary control unit of the respective PSCU. This information is consolidated in that, if any one or more of the CSMs of the secondary control unit produces an over-voltage or under-voltage shut-down command as described above with reference to FIG. 6, the command SSDC[1:0] 73 is produced accordingly, representing a logical OR combination of these commands. Conversely, the CSUP frame 80 has a secondary side start-up acknowledge (SSUA) bit 84 and a 2-bit secondary side shut-down acknowledgement PSDA[1:0] 85 to acknowledge these commands.

The CSDN frame 70 further includes a primary side voltage status (PVS) bit 77 which indicates whether or not the primary side supply voltage of the respective PSUC is good, a secondary side voltage status (SVS) bit 78 which indicates whether or not the secondary side supply voltage of the respective PSUC is good, and an interrupt status (INT) bit 79 which indicates a possible interrupt condition.

The CSUP frame 80 further includes a 2-bit secondary side voltage status (SVS) 87. One of these bits indicates whether or not the secondary side supply voltage is good; the other indicates whether or not the restart condition is satisfied for all of the CSMs of the PSCU. The CSUP frame 80 also includes a zero bit 88 which is unused here.

Figure 9:
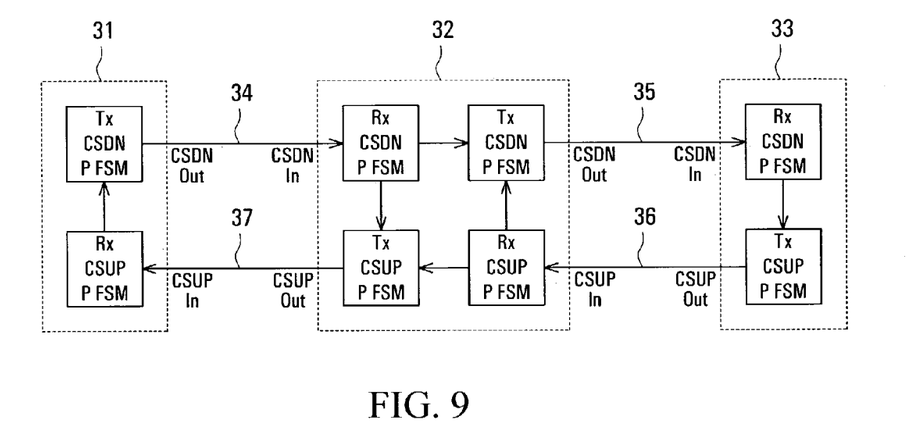
FIG. 9 illustrates interaction between the cascaded PSCUs in the arrangement of FIG. 3.

FIG. 9 illustrates interaction between the cascaded PSCUs 31 to 33 in the arrangement of FIG. 3, using similar references to those used in FIG. 3. In FIG. 9, the PSCU 32, having an adjacent PSCU both downstream and upstream from it, has a respective protocol finite state machine (P FSM) for receiving (Rx) on the CSDN path 34, for transmitting (Tx) on the CSDN path 35, for receiving on the CSUP path 36, and for transmitting on the CSUP path 37. The PSCU 33, having an adjacent PSCU only upstream from it, has respective P FSMs for receiving on the CSDN path 35 and for transmitting on the CSUP path 36. The PSCU 31, having an adjacent PSCU only downstream from it, has respective P FSMs for transmitting on the CSDN path 34 and for receiving on the CSUP path 37. Each P FSM is associated with a corresponding signal transmitter or receiver, not shown in FIG. 9.

Figure 10:
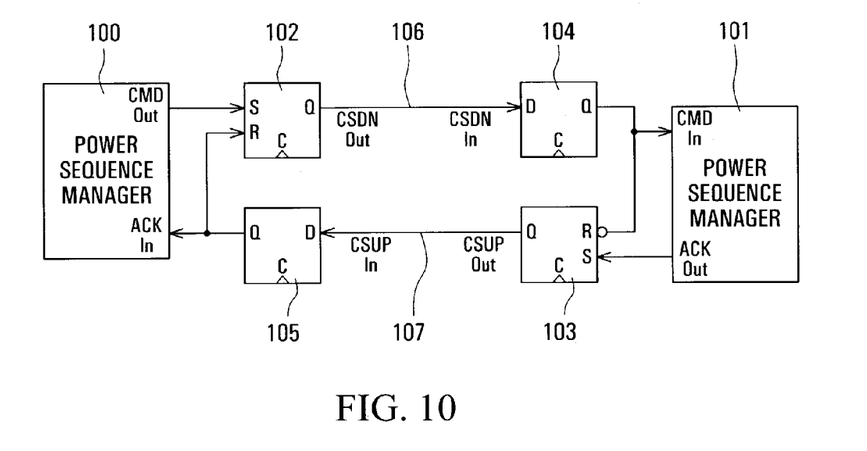
FIG. 10 illustrates handshaking for communications between adjacent PSCUs in the arrangement of FIG. 3.

The cascade path communications as described above use a fully interlocked handshake messaging protocol between adjacent PSCUs, for example as illustrated by FIG. 10. In FIG. 10, a 1-bit command and its acknowledgement between power sequence managers 100 and 101 of two adjacent PSCUs in the cascade chain are coupled via RS flip-flops 103, 104 and D flip-flops 105, 106, the flip-flops being clocked via clock inputs C by clock signals of the secondary control units of the respective PSCUs.

A command output (CMD Out) of the PSM 100 is connected to a set input S of the RS flip-flop 102, the output Q of which is coupled via a CSDN line 106, corresponding to the downstream cascade signal path 34 or 35 of FIGS. 3 and 9, to the D input of the flip-flop 104, the output Q of which is connected to a command input (CMD In) of the PSM 101. A corresponding acknowledgement output (ACK Out) of the PSM 101 is connected to a set input S of the flip-flop 103, the output Q of which is coupled via a CSUP line 107, corresponding to the upstream cascade signal path 36 or 37 of FIGS. 3 and 9, to the D input of the flip-flop 105, the output Q of which is connected to an acknowledge input (ACK In) of the PSM 100. The output Q of the flip-flop 104 is also connected to an inverting reset input R of the flip-flop 103, and the output Q of the flip-flop 105 is also connect to a reset input R of the flip-flop 102.

Consequently, a logic 1 command output from the PSM 100 sets the flip-flop 102 and is communicated via the line 106 and the flip-flop 104 to the command input of the PSM 101. A logic 1 acknowledgement of this command, output by the PSM 101 after it responds appropriately to the command, sets the flip-flop 103 and is communicated via the line 107 and the flip-flop 105 to the acknowledge input of the PSM 100, also resetting the flip-flop 102. This terminates the command via the line 106 and the flip-flop 104, and the resulting logic 0 produced at the Q output of the flip-flop 104 is supplied to the PSM 101 and resets the flip-flop 103, which produces a logic 0 output which is coupled via the line 107 and the flip-flop 105 to the acknowledge input of the PSM 100.

The handshaking provided by the messaging protocol as illustrated in FIG. 10 and described above provides reliable communication of commands and acknowledgements between adjacent PSCUs on the cascade signal paths. However, this is further complicated by the fact that commands and acknowledgements can have one or more sources and/or destinations.

For example, the primary side start-up and shut-down command bits 72 and 73 in the frame 70 originate in only the first PSCU 31, and are communicated via the CSDN signal path to all of the other PSCUs 32 and 33; corresponding acknowledgement bits 82 and 83 are produced by each of these other PSCUs 32 and 33. Thus these bits have multiple sources and the bits from different sources must be logically combined, in this case with an AND function. The secondary side shut-down bits 86 are produced by each of the PSCUs 31 to 33, so that in each of the PSCUs 31 and 32 the bits received via the CSUP signal path must be logically combined with the locally produced bits, in this case with an OR function. For example in the PSCU 32 again the corresponding acknowledgement bits 76 received via the CSDN signal path 34 and those produced locally must be logically combined, in this case with an AND function.

The following tables summarize the respective bits, sources, destinations, and logical combination functions for the signals on the CSDN and CSUP signal paths respectively. In these tables, Dns means all downstream, Ups means all upstream, NA means not applicable, and the first and last PSCUs refer to the PSCUs 31 and 33 respectively in the arrangement of FIG. 3.

| CSDN Signals | | | |
|---|---|---|---|
| Bit(s) | Source(s) | Destination(s) | Logic |
| CDCS | All PSCUs | All PSCUs | AND |
| PSUC | First PSCU | All PSCUs | NA |
| PSDC[1:0] | First PSCU | All PSCUs | NA |
| SSUC | Any PSCU | Dns PSCUs | AND |
| SSDC[1:0] | Any PSCU | Dns PSCUs | OR |
| SSDA[1:0] | Any PSCU | Dns PSCUs | AND |
| PVS | First PSCU | Last PSCU | NA |
| SVS | All PSCUs | Last PSCU | AND |
| INT | Any PSCU | Last PSCU | OR |

| CSUP Signals | | | |
|---|---|---|---|
| Bit(s) | Source(s) | Destination(s) | Logic |
| CUCS | All PSCUs | All PSCUs | AND |
| PSUA | All PSCUs | First PSCU | AND |
| PSDA[1:0] | All PSCUs | First PSCU | AND |
| SSUA | All PSCUs | Ups PSCUs | AND |
| SSDA[1:0] | All PSCUs | Ups PSCUs | AND |
| SSDC[1:0] | Any PSCU | Ups PSCUs | OR |
| SVS[1:0] | All PSCUs | First PSCU | AND |

Figure 11:
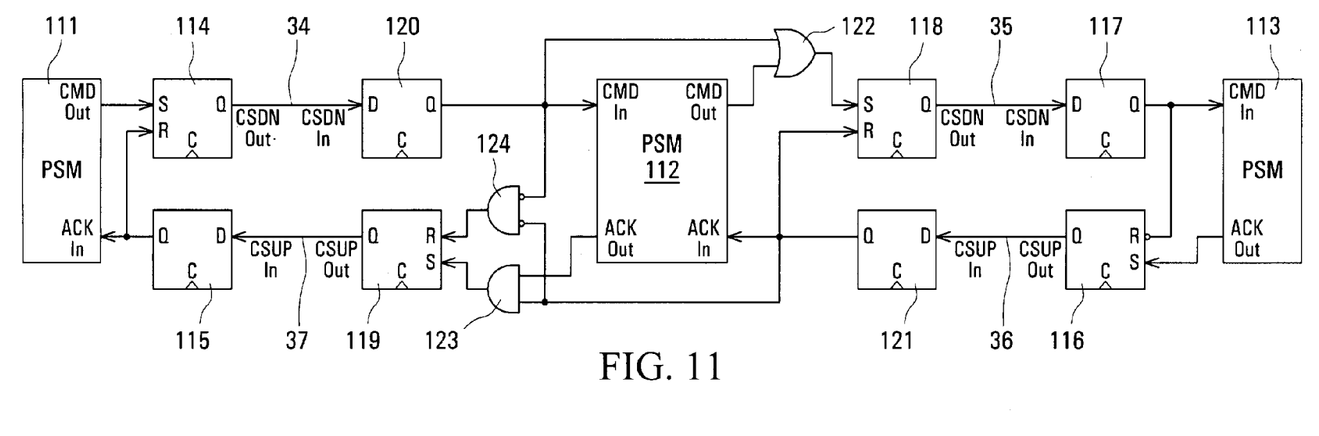
FIGS. 11 and 12 illustrate communications between the cascaded PSCUs in the arrangement of FIG. 3, using the handshaking of FIG. 10, with logical OR and logical AND command functions respectively.
Figure 12:
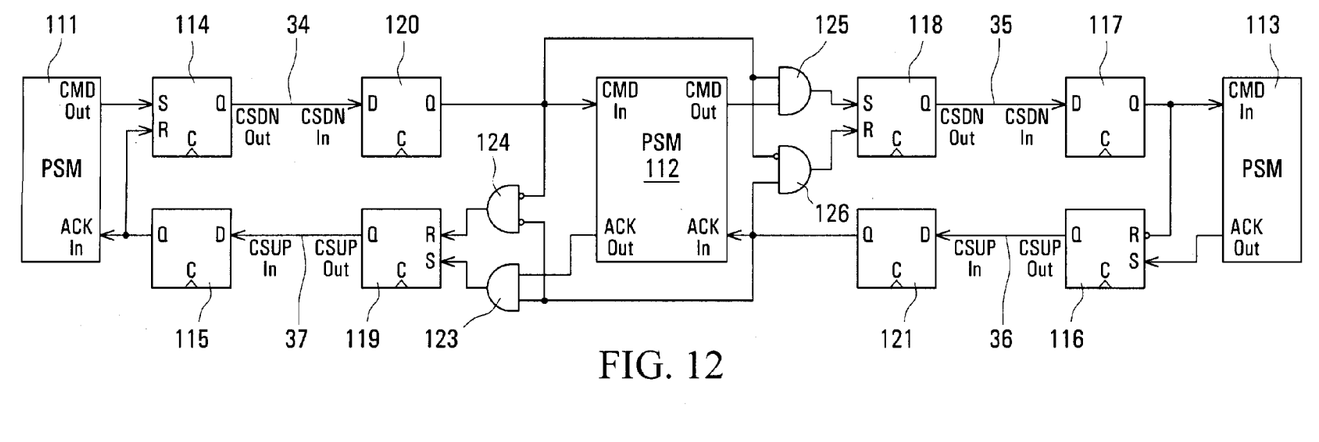

FIGS. 11 and 12 illustrate resulting arrangements for communications, for one command bit and its corresponding acknowledgement bit, between the PSCUs in the arrangement of FIG. 3, using the handshaking of FIG. 10, with logical OR and logical AND command functions respectively.

In each of FIGS. 11 and 12, the PSMs of the PSCUs 31 to 33 are represented at 111 to 113 respectively. Also in each of FIGS. 11 and 12, for the first PSCU 31 the arrangement of the PSM 111 and associated flip-flops 114 and 115 is the same as that of the components 100, 102, and 105 in FIG. 10, and for the last PSCU 33 the arrangement of the PSM 113 and associated flip-flops 116 and 117 is the same as that of the components 101, 103, and 104 in FIG. 10. For the PSCU 32, the PSM 112 has associated RS flip-flops 118, 119 via which the PSM transmits respective bits to the CSDN signal path 35 and the CSUP signal path 37 respectively, and D flip-flops 120, 121 via which the PSM receives respective bits from the CSDN signal path 34 and the CSUP signal path 36 respectively.

To provide a logical OR function for a downstream command as described above, in the arrangement of FIG. 11 the downstream command input to the PSM 112 from the output of the flip-flop 120 is combined in an OR gate 122 with the downstream command output of the PSM 112, the output of the OR gate 122 being connected to the reset input R of the flip-flop 118. Conversely, to provide an AND function for the corresponding acknowledgement bit on the upstream signal path 37, the acknowledge input to the PSM 112 from the output Q of the D flip-flop 121 and the acknowledge output of the PSM 112 are combined in an AND gate 123, the output of the AND gate 123 being connected to the set input S of the flip-flop 119. In addition, this acknowledge input to the PSM 112 and the command input to the PSM 112 from the output of the flip-flop 120 are supplied to a NOR gate 124 (an AND gate with inverting inputs), the output of the NOR gate 124 being connected to the reset input R of the flip-flop 119.

To provide a logical AND function for a downstream command as described above, as shown in the arrangement of FIG. 12 the OR gate 122 of the arrangement of FIG. 11 is replaced by an AND gate 125 with similar connections, and an AND gate 126 is added into the path from the output Q of the flip-flop 121 to the reset input R of the flip-flop 118, this AND gate 126 also having an inverting input connected to the output Q of the flip-flop 120 providing the downstream command input to the PSM 112. A corresponding acknowledgement with a logical AND function is provided in the same way as in FIG. 11, using the gates 123 and 124 connected in the same manner.

It can be appreciated that the logical AND and OR combinations as described above can be provided using hardware, e.g. gates as described above, with switching or routing of the respective signal bits in the CSDN and CSUP frames, and/or in software.

It can also be appreciated that the cascade arrangement as described above enables all of the necessary information for the sequencing of the power supplies controlled by the CSMs of a plurality of PSCUs to be communicated among the PSCUs with a very limited number of signal paths, specifically only one signal path in each direction for each adjacent PSCU, by providing constraints such as the single path linear sequencing between adjacent PSCUs and the logical combinations of commands and acknowledgements. Such a small number of signal paths is particularly advantageous when the PSCUs are constituted by integrated packages between which connections are made to provide the signal paths. In consequence, in a power supply arrangement a relatively arbitrary number of power supplies can be controlled by respective CSMs of an appropriate number of PSCUs.

Although the invention is described above in the context of power supply control units, the invention is not limited to this application but can also be used in other signal coupling applications.

Thus although particular embodiments of the invention and examples have been described above in detail, it can be appreciated that numerous modifications, variations, and adaptations may be made without departing from the scope of the invention as defined in the claims.

The invention claimed is:

1. A method of controlling a plurality of controlled devices in a predetermined sequence, comprising the steps of:
providing a plurality of control units each comprising a plurality of state machines each for controlling a respective controlled device;
allocating the plurality of controlled devices to respective state machines in said plurality of control units whereby the control units are cascaded in accordance with the predetermined sequence, with a single linear path of the predetermined sequence between adjacent cascaded control units;
within each of the control units, coupling signals of each state machine to each other state machine for controlling the respective controlled devices, controlled by said state machines, in accordance with the predetermined sequence; and
between adjacent ones of the cascaded control units, coupling signals relating to the state machines of the control units in both directions between the cascaded units for control of the controlled devices in accordance with the predetermined sequence.

2. A method as claimed in claim 1 wherein the signals relating to the state machines of the control units are coupled serially in signal frames between the adjacent cascaded units.

3. A method as claimed in claim 1 and including the step of, in at least one control unit, logically combining signals relating to the state machines of the control units received from a preceding control unit in a respective signal direction with signals relating to the state machines of said one control unit to produce the signals relating to the state machines of the control units for a subsequent control unit in the respective signal direction.

4. A method as claimed in claim 1 wherein the controlled devices comprise power supplies.

5. A method of controlling a plurality of power supplies, comprising the steps of:
providing a plurality of power supply controller units (PSCUs) in cascade, each PSCU comprising an input state machine for monitoring an input voltage for the power supplies and a plurality of further state machines each for enabling and monitoring an output of a respective power supply;
in a first PSCU in the cascade, determining for each of said further state machines a dependence upon the input voltage or the output of a power supply as monitored by at least one other state machine of this first PSCU, for enabling the respective power supply;
in each subsequent PSCU in the cascade, determining for one of the further state machines of this subsequent PSCU a dependence upon the output of a power supply as monitored by a state machine of the respective preceding PSCU, and determining for each other of the further state machines of this subsequent PSCU a dependence upon the output of a power supply as monitored by at least one other state machine of this subsequent PSCU, for enabling the respective power supply; and coupling signals relating to the state machines of the PSCUs in both directions between adjacent PSCUs in the cascade;

whereby the power supplies are enabled in a predetermined sequence in dependence upon the input voltage.

6. A method as claimed in claim 5 wherein the signals coupled between adjacent PSCUs comprise commands for enabling or disabling the controlled power supplies and acknowledgements of said commands.

7. A method as claimed in claim 5 wherein the signals relating to the state machines of the PSCUs are coupled between the adjacent PSCUs in the cascade serially in signal frames.

8. A method as claimed in claim 7 wherein the signals coupled between the adjacent PSCUs comprise commands for enabling or disabling the controlled power supplies and acknowledgements of said commands.

9. A method as claimed in claim 5 wherein there are at least three PSCUs, the method including the step of, in at least one PSCU, logically combining signals relating to the state machines of the PSCUs received from a preceding PSCU in a respective signal direction with signals relating to the state machines of said one PSCU to produce the signals relating to the state machines of the PSCUs for a subsequent PSCU in the respective signal direction.

10. A method as claimed in claim 5 wherein a dependence upon the input voltage is determined for at least two of said further state machines in the first PSCU in the cascade for enabling the respective power supplies.

11. A method as claimed in claim 5 wherein, in at least one of the PSCUs, a dependence upon the output of the same power supply, as monitored by at least one other state machine, is determined for each of at least two of said further state machines of the PSCU.

12. A method as claimed in claim 5 wherein, in at least one of the PSCUs, a dependence upon the outputs of a plurality of power supplies, as monitored by a corresponding plurality of other state machines, is determined for at least one of said further state machines of the PSCU.

13. A power supply control arrangement comprising:

a plurality of power supply controller units (PSCUs) each comprising an input state machine for monitoring an input voltage for a plurality of controlled power supplies and a plurality of further state machines each for enabling and monitoring an output of a respective power supply, the PSCUs being coupled in cascade for signal coupling therebetween, and the state machines being arranged, for carrying out the method of claim 5; and a plurality of power supplies arranged to receive said input voltage and controlled by respective ones of said further state machines.

14. A power supply control arrangement as claimed in claim 13 wherein the PSCUs comprise programmable devices identical to one another.

15. A power supply control arrangement as claimed in claim 14 wherein each PSCU includes a non-volatile memory for storing information relating to the predetermined sequence for the power supplies controlled by the PSCU.

\* \* \* \* \*